Aug. 18, 1953  B. BAYUK  2,649,263
ROTARY LAUNCHING SYSTEM AND APPARATUS
FOR TARGET AIRCRAFT
Filed March 13, 1951  2 Sheets-Sheet 1

INVENTOR.
BERNARD BAYUK
BY
*Wade Coouty*
*Charles H. Wagner*
ATTORNEYS

Aug. 18, 1953
B. BAYUK
2,649,263
ROTARY LAUNCHING SYSTEM AND APPARATUS
FOR TARGET AIRCRAFT
Filed March 13, 1951
2 Sheets-Sheet 2
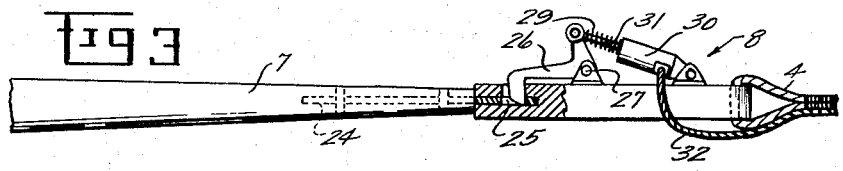
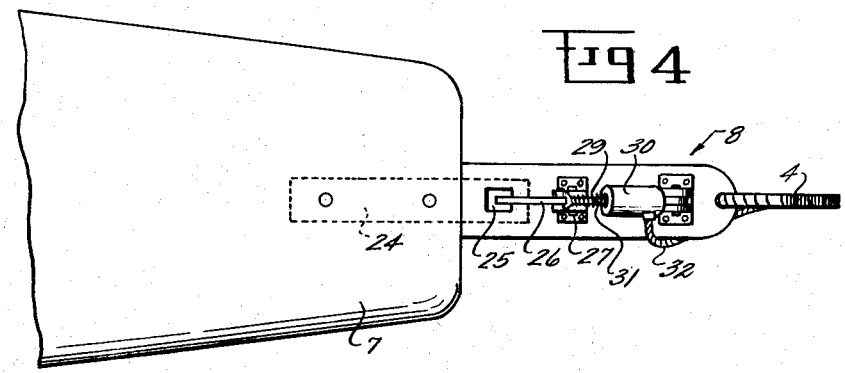
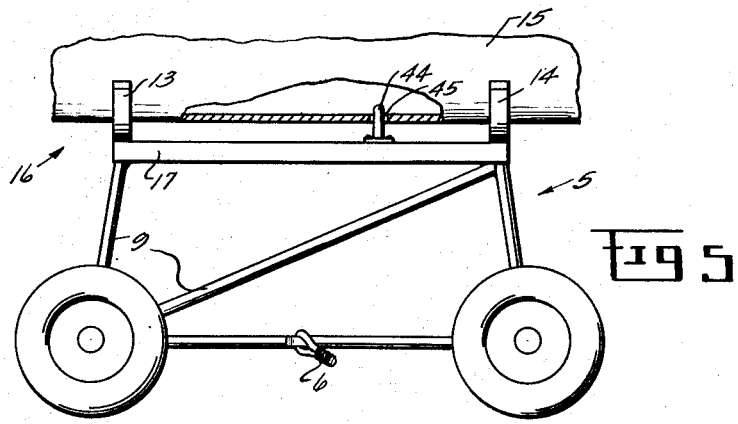
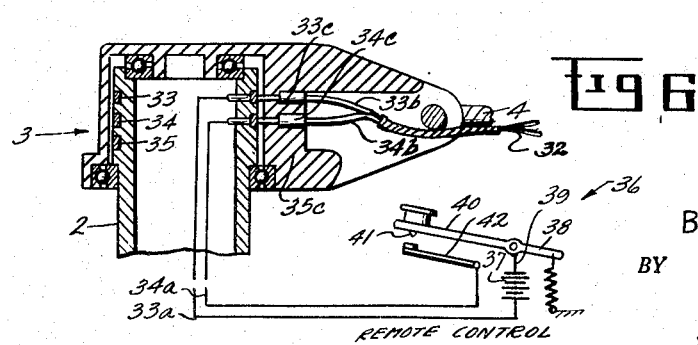
INVENTOR.
BERNARD BAYUK
BY
ATTORNEYS Patented Aug. 18, 1953

2,649,263

UNITED STATES PATENT OFFICE 2,649,263

ROTARY LAUNCHING SYSTEM AND APPARATUS FOR TARGET AIRCRAFT

Bernard Bayuk, Dayton, Ohio

Application March 13, 1951, Serial No. 215,369

4 Claims. (Cl. 244—63)

(Granted under Title 35, U. S. Code (1952), sec. 266)

The invention described herein may be manufactured and used by or for the United States Government for governmental purposes without payment to me of any royalty thereon.

This invention relates to launching devices for aircraft and more particularly to a rotary launching system and apparatus for small military target aircraft.

Target airplanes are small, self-propelled, relatively high speed aircraft which are remotely controlled by radiant energy such as radio. In the past several methods have been employed for launching these airplanes but these methods have not been entirely satisfactory, and in addition they required special somewhat expensive launching equipment and separate power units for accelerating the target airplanes up to their take-off and flying speeds.

One former method and apparatus employed a compressed spring or extended bungee cord and the target plane was brought up to flying speed by the sudden application of the power applied by the spring or the extensible elastic cord. Another launching method was to utilize rocket power (Pato) units. The target airplane rested upon a cart which was sped up a ramp by the application of this rocket power and upon reaching the end of the ramp the cart was stopped and the target continued on into flight under the power of its own engine or engines very much like the conventional catapult.

The present invention, on the other hand, utililizes a much simplified arrangement with the elimination of external power sources, the engine of the target airplane providing the necessary power for bringing the target airplane up to, and beyond the normal take-off speed before the take-off is made. The invention utilizes a circular smooth flat track or runway, and a cart or supporting carriage is provided for supporting the target airplane above the surface of the annular circular runway during acceleration, and up to at the instant of take-off. The flat smooth surface of the track provides excellent rolling conditions for the pneumatic tires of the carriage, and a pylon is provided at the center of curvature of the runway having a rotatable bearing at its upper end to which a restraining electrical conductor and control cable is attached. The other end of the control cable is detachably connected to the "inner" wing end of the target plane, and also securely attached to the side of the carriage. A detachable positioning connection is preferably provided between the carriage and the target airplane for retaining the airplane in place in a cradle-like top portion of the carriage during movement of the airplane up to take-off speed, suitable electro-magnetic release means being provided for releasing the restraining cable from the inner end of the wing, electrical conductors being connected to the electro-magnetic release means, extend along the control cable to the pylon connection or bearing member, a suitable electric circuit and manually actuated release initiating means being provided. Slip rings are provided between the pylon and the rotatable bearing member for maintaining the electrical circuit for releasing the target airplane for flight under its own power at any desired point on the annular track or runway, from a suitable remote control point. The target airplane can therefore be released for an initial straight flight in any direction.

The target airplane is supported by the carriage in a neutral or negative flight angle or attitude sufficient to prevent premature take-off until the plane is rocked upwardly on the carriage, therefore the target airplane can be accelerated to a speed above minimum take-off speed before release, the target airplane being maintained on the carriage during acceleration to the take-off speed under remote radio control, keeping the elevators depressed. Once the target airplane is releasd it will preferably be adjusted to fly initially a straight course, tangent to the circular runway, and can be remotely controlled thereafter by radio in the conventional manner. The target aircraft is positioned on the carriage and preferably rests thereon in a neutral or negative flight position so that once the target aircraft has been accelerated to, or above, normal flying speed and the depressed elevators are raised by radio control to rock the plane upwardly it will take off immediately and quickly, the initial depression of the elevators under radio control before release preventing the target aircraft from becoming airborne, even though accelerated to a speed somewhat in excess of its flying speed.

Other objects and advantages of the invention will become apparent by reference to the following description taken in connection with the accompanying drawings, in which like reference characters refer to like parts in the several figures.

Drawings

Fig. 3 is a fragmentary enlarged somewhat diagrammatic detail view of the tethered end portion of the wing of the target airplane, illustrating one form of electrically releasable latch member carried by the tethering cable.

Fig. 4 is a top plan view of the structure illustrated in Fig. 3.

Figure 1:
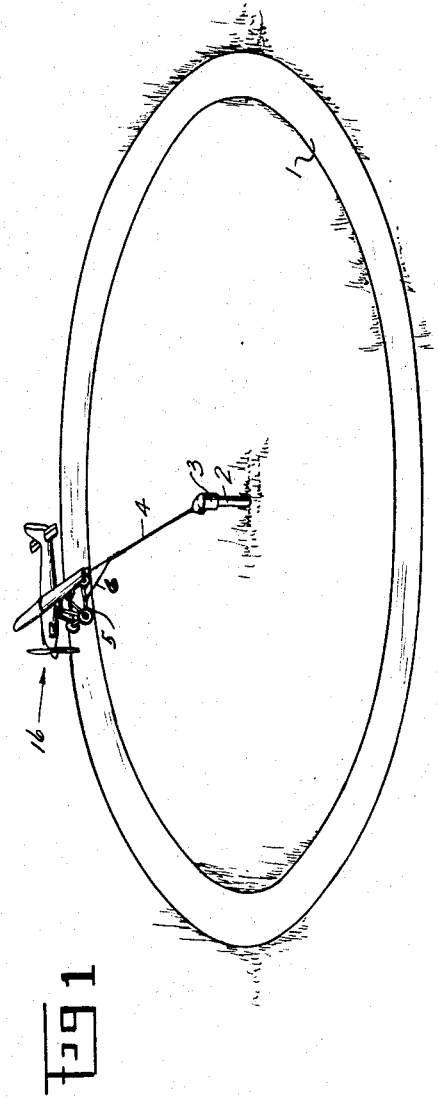
Fig. 1 is a somewhat diagrammatic perspective view illustrating my improved target aircraft launching system and apparatus generally.

Fig. 5 is a somewhat diagrammatic enlarged fragmentary detail view, parts being broken away and shown in section, illustrating one form of interengaging connection on the carriage for holding the target airplne in position on the carriage during acceleration of the target airplane to take-off speed, and Fig. 6 is a fragmentary detail vertical sectional view taken through the upper end of the pylon, illustrating the rotatable bearing member journalled on the end of the pylon, to which the tethering cable is secured, also illustrating one type of slip ring and contact arrangement that may be used between the pylon and the rotatable bearing for establishing the electrical control or release circuits to the release latch member from some stationary remote control point, a control circuit for energizing the release member being also diagrammatically disclosed in this figure of the drawing, whereby the tethering cable can be released from the target airplane.

Figure 2:
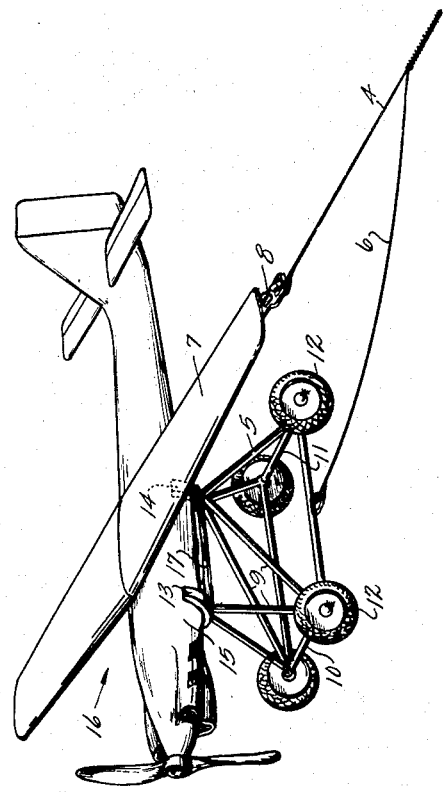
Fig. 2 is an enlarged perspective view somewhat schematically illustrating the carriage with one type of radio controlled target airplane mounted thereon, illustrating more clearly the attachment of the combined tethering or restraining cable means and the electrical circuit conductor means for controlling release of the cable means from the target aircraft.

Referring to Figs. 1 and 2 of the drawing the reference numeral 1 denotes a circular flat runway or track, which is preferably constructed of concrete so that its annular flat surface will be level and smooth. The diameter of the runway will depend, of course, upon the size of the target airplane that is to be launched, and to some extent its launching speed. At the center of the track or runway 1 is a pylon or post 2 having a suitable bearing member 3 journaled at the top thereof for free rotation (shown in detail in Fig. 6). The bearing member 3 has secured thereto a tethering control cable 4, and also carries suitable brush contacts which slidably engage slip ring contacts as the bearing member rotates. These contacts will be later referred to in detail.

A four-wheel carriage is secured to the tethering cable 4 by a branch cable 6, the tethering cable 4 being detachably fastened to the "inner" end of the target airplane wing 7 by a suitable electrically releasable fastener or latch member 8, later described, shown in detail in Figs. 3 and 4.

The carriage 5 comprises a rigid frame 9 having front and rear axles 10 and 11 respectively, on which pneumatic tired wheels 12 are freely journaled. The axes of the wheels 12 preferably extend toward the center of the track, or pylon location, when the carriage 5 is positioned on the runway 1 so that there will be a natural tendency for the carriage to follow the curvature of the annular runway 1 during carriage travel and thus eliminate excess tire wear.

The upper portion of the carriage frame 9 is formed with longitudinally spaced cradle frames or bars 13 and 14, shaped to receive the lower portion of the body or fuselage of the target airplane 16 therein at opposite sides of its center of gravity, whereby the target airplane will be substantially supported horizontally fore and aft, above the carriage in a neutral or slightly negative flight attitude position over the centerline of the track 1. A longitudinal frame member 17 preferably extends between the fore and aft cradle members 13 and 14. The target airplane may take off from the carriage at any time after its flying speed is attained when a radio signal is sent causing the elevators to be raised, rocking the plane upwardly causing it to leave the carriage 5 on the track, tethered to the pylon 2 through the tethering control cable 4 and the cable 6.

When the target plane 16 is positioned on the carriage 5 the end of the wing 7 which projects toward the pylon, and is referred to as the "inner end," and is provided with a latch plate 24, a portion of which projects beyond the end of the wing surface and is notched or apertured at 25 to receive the latch member 26 which is pivoted at 27 to the detachable connector member 8 secured to the end of the tethering cable 4.

This detachable connector 8 is preferably socketed to receive the extending exposed portion of the latch plate 24 therein and is apertured to receive the latch end of the latch member 26. A spring 29 yieldably retains the latch member 26 in engagement with the aperture in the end of the plate 24.

A solenoid magnet 30 has an armature 31 connected to the latch 26, electrical conductors 32 being connected to the magnet 30 for energizing the magnet to release the end of target airplane wing 7 from the tethering cable 4, the conductors 32 being preferable secured in, or on, or to the tethering cable 4. While any electrical release or energizing circuit may be provided, whereby a closing of a switch means in the circuit releases the target airplane from the tethering cable 4, one form of electrical connection which may be used at the pylon comprises a plurality of slip rings 33, and 34 mounted at the top of the pylon 2 in insulated relation to each other and connected to conductors 33a and 34a which lead dwnwardly from the respective slip rings to a suitably located remote control switch element 36. These electrical conductors may extend under ground to some desired point at one side of the pylon 2, or they may extend beyond the confines of the annular track 1 to a suitable remote control station, or control tower (not shown).

The tethering cable 4 carries the electrical energizing conductors 33b, and 34b connected respectively to the brushes or contacts 33c, and 34c fixed in the rotatable bearing member 3, respectively engaging the slip rings 33, and 34. One of the wires 32 to the release magnet 30 is connected to each of the conductors 33b and 34b. The conductor 33a from the slip ring 33 is connected to one side of the power supply or battery 37, as indicated diagrammatically in Fig. 6. The other side of the battery is connected to the switch terminal 38 by the extension wire 39. The other wire 34a connects the slip ring 34 to the other switch contact 42. Closing of the switch member 40 on the switch contact 42 completes the circuit to the electro magnet 30 through the conductors 33a, 33b and 34a, 34b.

In the wiring diagram (incorporated in Fig. 6), when the switch handle 40 is depressed the contact 41 engages the switch contact blade 42, connected to conductor 34a which closes the release circuit releasing the airplane from the cable 4, however the target airplane can fly around the pylon 2 tethered to the pylon but free of the carriage if desired until depression of the switch 40 operates the release device, freeing the target airplane from the cable 4 at any selected point in the circumference of the annular track. After the release of the target plane from the tethering cable it can be radio controlled in the conventional manner.

Briefly describing the operation, the target airplane 16 is placed on the carriage 5, and some interengaging positioning means being provided, such as a projection or pin 44 on the carriage 5 which engages a notch or aperture 45 in, or on, the target plane to prevent relative longitudinal shifting, or any tendency of the target plane to "roll" on the carriage, securely but releasably interlocking the target plane on the carriage in a suitable neutral "flight attitude" in its cradle 14, as shown in Fig. 5.

The releasable end 8 of the tethering cable 4 is latched to the plate 24, as shown in Fig. 3, and the controls of the target aeroplane are preferably set by remote radio control for a negative flight angle (elevators depressed). When flying speed is attained a radio signal is sent to the target airplane raising the elevators, causing the airplane to be rocked upwardly to a positive flight attitude.

The carriage is, of course, positioned on the runway 1 with the slack in the tethering cable 4 taken up between bearing member 3 on the pylon and the cable connection to the end of the wing. The plane will accelerate in speed under its own power causing the carriage to roll around the track 1, the centrifugal force applied to the end of the wing tending to keep the carriage and airplane axis tangent to the runway at all times. When the target plane attains flying speed, then at the desired take-off point around the circumference of the track the radio signal is sent, causing the elevators to be raised and the target plane is rocked upwardly to take off from the carriage 5. Withdrawal of the latch 26 by the depression of the switch member 40 disconnects the cable 4 from the end of the wing, completely freeing the target airplane, and the target plane leaves the launching device at a tangent to the track circumference, its flight direction depending upon the exact selected point where the switch 40 is actuated to withdraw the latch element 26.

Once in the air the target airplne is conventionally controlled by radiant energy, and is also conventionally landed, preferable by an attached parachute which is also released by remote radio control and forms no part of this invention.

While one embodiment of my invention is shown and described for exemplary purposes, it is to be understood that I do not desire to confine myself to the precise details of construction described herein as set forth by way of illustration, as it is apparent that many changes and variations may be made therein by those skilled in the art, without departing from the spirit of the invention, or exceeding the scope of the appended claims.

I claim:

1. A rotary launching apparatus for a radio controlled target airplane having a power plant for its propulsion comprising; an annular circular flat track; a four wheeled carriage disposed on the track and arranged for circular movement about the center of the track, said carriage having a pair of cradle members thereon for supporting the target airplane in a neutral flight attitude above the surface of the circular track at points fore and aft of the airplane's center of gravity; a pylon at the center of the circular track, a tethering cable secured at one end to the pylon and a branch cable connected at one end to the tethering cable at its other end to the carriage; a releasable connection carried by the outer end of the tethering cable releasably connectible to the end of the target airplane wing nearest to the pylon with slack out of the tethering cable when the target airplane is mounted in said cradle; and remote controlled release means connected to said releasable connection, for actuating the said releasable connection to release the airplane wing from the tethering cable during movement of the carriage on the annular track about the pylon.

2. Apparatus as claimed in claim 1 including interengaging positioning means carried by the carriage for positioning the target airplane on the carriage in said predetermined neutral flight attitude position during its movement with the carriage about the pylon to prevent relative fore and aft and rolling movements between the airplane and the cradle members of the carriage.

3. A rotary launching apparatus for remote controlled target airplanes; comprising a circular track; a pylon at its center; a multiwheeled carriage positioned on the track surface for circular travel thereon about said pylon; cradle means fixed on the carriage for supporting the target aircraft fore and aft and at opposite sides of its center of gravity in a predetermined neutral flight attitude above the carriage, a tethering cable connected at one end to the pylon, electrically releasable securing means fixed to the other end of the tethering cable, including means for releasably connecting that end of the tethering cable to the end portion of the wing of the target airplane extending toward the pylon when the target airplane is mounted on the cradle means; and an electrical release circuit connected to said electrically releasable securing means for actuation thereof to release the tethering cable from said end portion of said wing, including an electrical conductor means carried by the tethering cable and a remotely located circuit closing means in said circuit.

4. A rotary target airplane launching apparatus for radio controlled target aircraft, a circular flat track, a four wheeled carriage supported thereon for movement about the center of the track, longitudinally spaced cradle means fixed on said carriage for supporting a remotely controlled target airplane thereon comprising fore and aft spaced supports shaped to fit the lower side of the fuselage of the target aircraft fore and aft of its center of gravity and the support target aircraft thereon in a neutral flight attitude, interengaging target airplane positioning means fixed on the carriage for interengagement with the body of the target aircraft to prevent relative longitudinal or rolling movement thereof relative to the carriage and disengageable by vertical movement of the airplane from the cradle supports, a pylon fixed at the center of the track, and a tethering cable connected at one end to the pylon and its opposite end to the extreme inner end of the wing of a target airplane mounted on the spaced supports for controlling the direction of movement of the carriage on the circular track around the pylon including electrically releasable securing means between the cable and the said inner wing end, and an electrical circuit including conductor means carried by the tethering cable and switch means in said circuit.

BERNARD BAYUK.

References Cited in the file of this patent

UNITED STATES PATENTS

| Number | Name | Date |
|---|---|---|
| 1,033,148 | Bond | July 23, 1912 |
| 1,327,464 | Dewick et al. | Jan. 6, 1920 |
| 1,376,825 | Napier | May 3, 1921 |
| 1,773,462 | Lambdin | Aug. 19, 1930 |
| 2,135,033 | Courtney | Nov. 1, 1938 |
| 2,306,750 | Nove | July 2, 1940 |
| 2,436,240 | Wiertz | Feb. 17, 1948 |

FOREIGN PATENTS

| Number | Country | Date |
|---|---|---|
| 763,073 | France | Feb. 5, 1934 |